United States Patent [19]

Ushikubo

[11] Patent Number: 4,736,096

[45] Date of Patent: Apr. 5, 1988

[54] DATA COLLECTION SYSTEM USING A BAR CODE READER

[75] Inventor: Kohei Ushikubo, Gunma, Japan

[73] Assignee: Sanden Corporation, Japan

[21] Appl. No.: 821,952

[22] Filed: Jan. 24, 1986

[30] Foreign Application Priority Data

Jan. 24, 1985 [JP] Japan .................................. 60-9817
Mar. 13, 1985 [JP] Japan ................................ 60-49898
Mar. 13, 1985 [JP] Japan ................................ 60-49899
Oct. 21, 1985 [JP] Japan .............................. 60-233533

[51] Int. Cl.$^4$ ............................................... G06K 7/10
[52] U.S. Cl. .................................... 235/472; 235/381; 235/419; 235/487
[58] Field of Search ................ 235/472, 381, 487, 419

[56] References Cited

U.S. PATENT DOCUMENTS 4,423,319  12/1983  Jacobsen ............................. 235/472
4,575,625   3/1986  Knowles ............................. 235/472
4,588,881   5/1986  Pejas .................................. 235/472

Primary Examiner—Harold I. Pitts
Attorney, Agent, or Firm—Banner, Birch, McKie & Beckett

[57] ABSTRACT

A data collection system, for gathering data from remotely located machines such as automatic vending machines, includes a data delivery section in each of the machines adapted for converting the data to be gathered into a signal resembling the light reflected by a bar code when the bar code is optically scanned. The system also includes a portable bar code reader for converting the light signal into an electric signal.

6 Claims, 7 Drawing Sheets

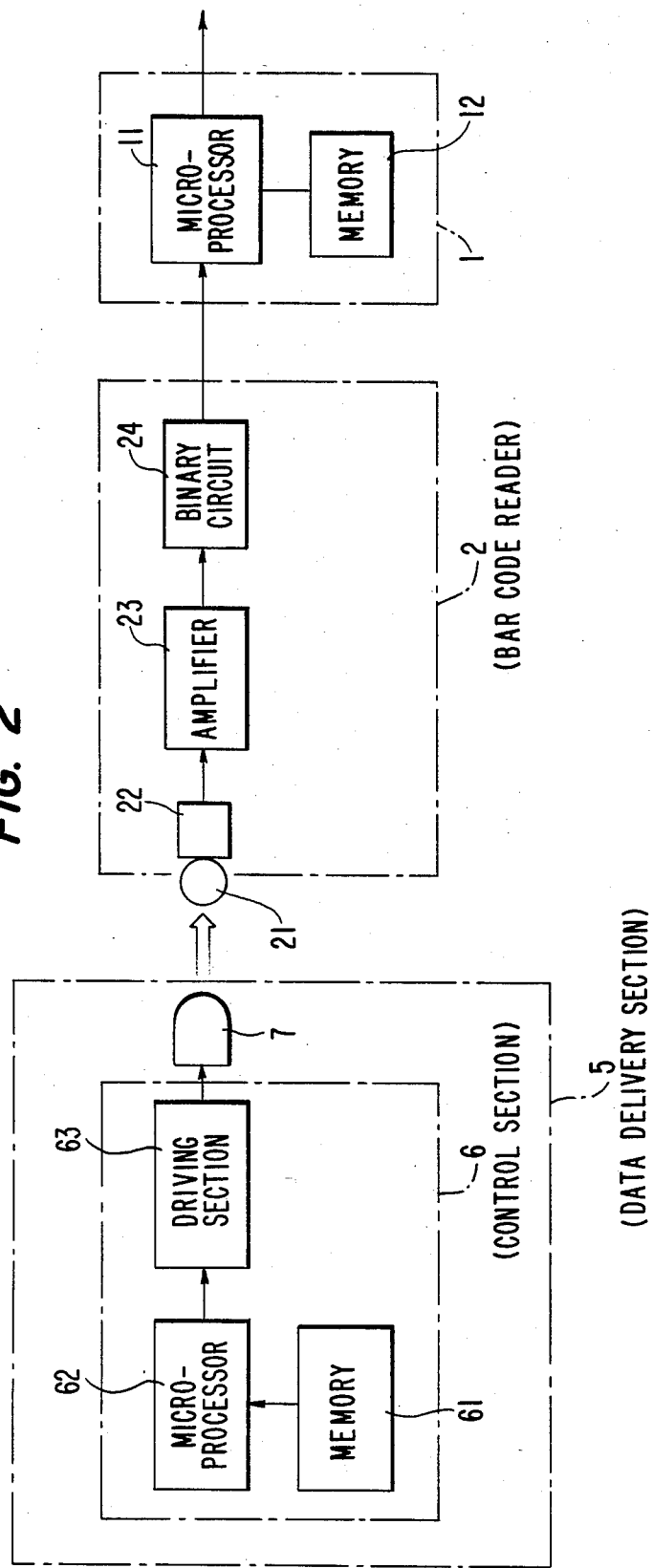
FIG. 2
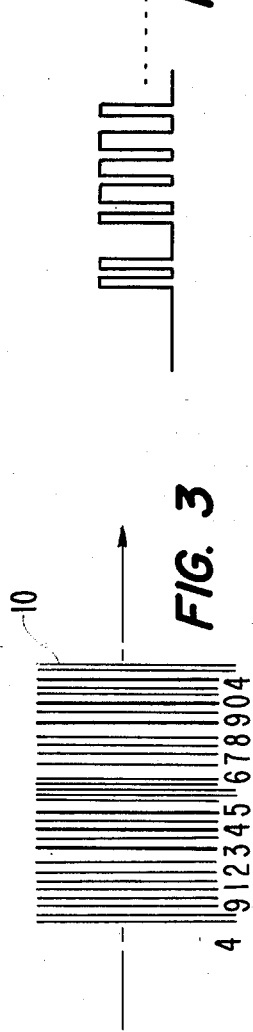
FIG. 3
FIG. 4

DATA COLLECTION SYSTEM USING A BAR CODE READER

BACKGROUND OF THE INVENTION

1. Field of the Invention

The present invention relates to a data gathering system for gathering data by means of portable data gathering terminal equipment and, more particularly, to a system for gathering data by means of a portable bar code reader from remotely located equipment in which the data is stored.

2. Description of the Prior Art

Collecting data by means of a bar code reader has been a widely used method. An example of such a method will be explained in connection with FIG. 3 which illustrates a data gathering method that makes use of portable data gathering device 1 having a pen-type bar code reader 2. For instance, bar code labels representing the identification numbers of goods are displayed in the vicinity of the goods in a supermarket. Before the manager of the store places an order for stocking, he scans the bar code label by means of bar code reader 2 and enters any other necessary data by means of keypad 3. The input data is displayed on display 4 and, at the same time, stored in a memory. The data for various products are output to a central computer for the stocking of the goods. Portable data gathering devices having bar code readers are commercially available at a comparatively low price.

A type of data gathering system is also used for gathering administrative data form a plurality of automatic vending machines. Vending machines are placed at many remote locations, and the supply of goods and collection of coins for these machines are accomplished periodically at a suitable interval. When supplying the goods and collecting coins, the person in charge has to gather administrative data such as the number of articles sold, total sales, quantities of goods supplied, and so forth. The data gathering system allows automatic gathering of a good deal of administrative data simply and quickly, thereby saving labor. The data gathering device conventionally used for such a purpose is different from the bar-code type; namely, the data is gathered through electric or optical coupling with the machine's control section which includes a memory to store the data. This system, however, suffers from a disadvantage in that the data formats and interface conditions for data transmission differ according to the manufacturer of the vending machine, i.e., they are not standardized. The companies which supply goods to automatic vending machines must deal with machines of different manufacturers and, therefore, are obliged to carry several different data gathering devices satisfying different interface conditions and data formats, which is quite uneconomical and impractical.

Thus, the gathering of data from automatic venders is preferably conducted by a single commercially available portable data gathering terminal, from the view point of utility and price. This, however, is difficult to realize because of diversification of the coupling interfaces.

SUMMARY OF THE INVENTION

The present invention has as its primary object providing a data gathering system which permits simple and quick gathering of data by means of a portable data gathering device having a portable bar code reader from a plurality of remotely located machines such as automatic venders.

To this end, according to the invention, there is provided a data collection system for gathering data from a plurality of machines comprising a data delivery system in each of the machines and adapted for converting the data to be gathered into an optical signal which resembles the light reflectd by a bar code when the bar code is optically scanned; and a portable bar code reader for converting the optical signal into an electric signal.

The above and other objects, features and advantages of the invention will become clear from the following description of the preferred embodiments when read in conjunction with the accompanying drawings.

BRIEF DESCRIPTION OF THE DRAWINGS

FIG. 2 is a schematic block diagram of a data gathering system embodying the invention;

FIG. 3 illustrates an example of a bar code symbol;

FIG. 4 is an illustration of a portion of the pulse width modulated electric signal obtained by scanning the bar code symbol of FIG. 3 by means of a bar code reader;

DESCRIPTION OF THE PREFERRED EMBODIMENTS

Figure 1:
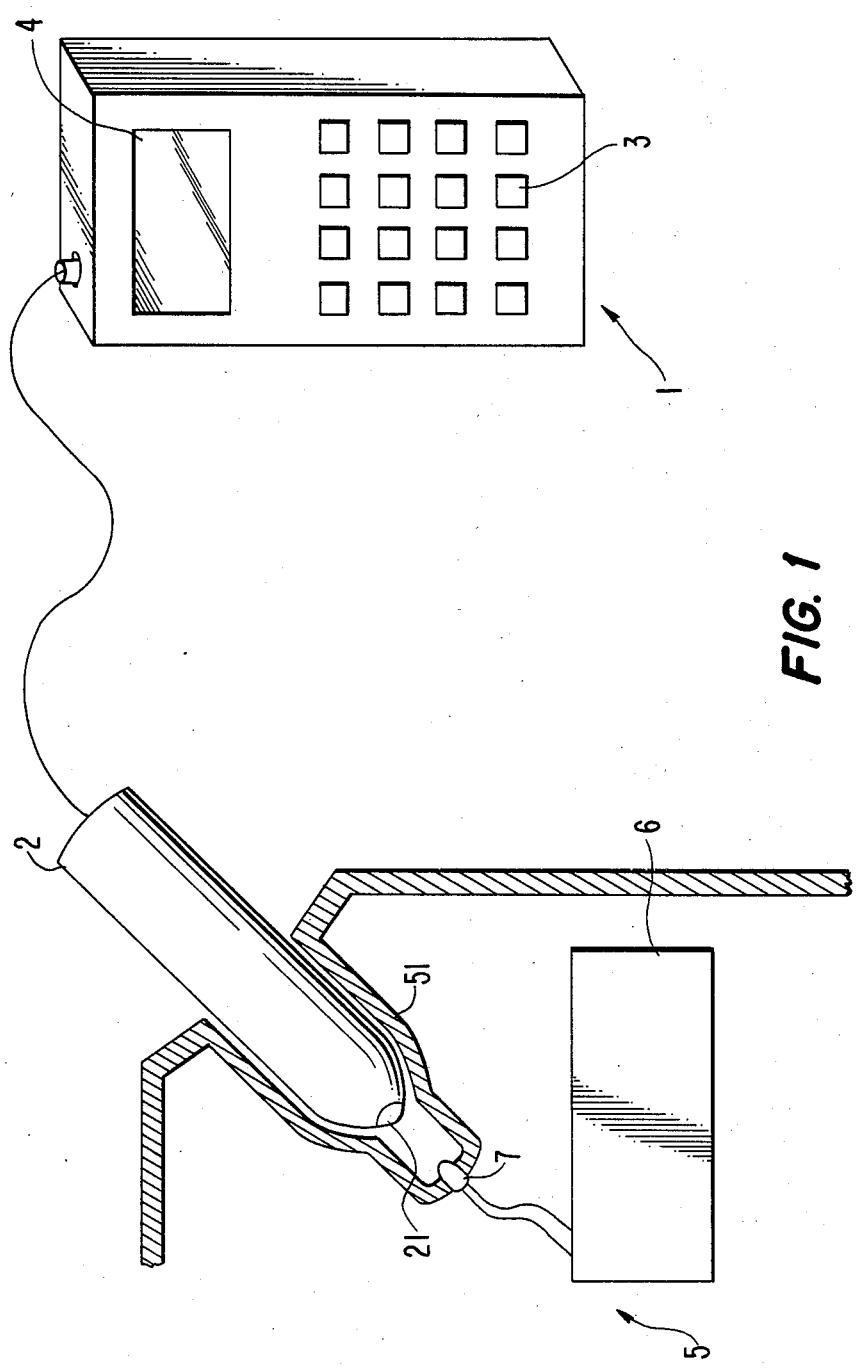
FIG. 1 is an illustration of the coupling between a portable data gathering device and a vending machine in a data gathering system embodying the present invention.

FIG. 1 is an illustration of the coupling between the data delivery section of an automatic vending machine and a portable data gathering device, with the main portion of the vending machine itself being omitted. The data delivery section 5 is composed of a control section 6 and a light-emitting section 7. Th control section 6 has a built-in memory (not shown) in which are stored administrative data to be transmitted to a portable data gathering device. This data storing method is the same as that used in the conventional system so that detailed description will not be needed.

The data delivery section 5 also has a receptacle 51 for receiving a pen-type bar code reader 2 connected to the data gathering device. The light-emitting section 7 mentioned above is mounted in this receptacle 51. The light-emitting section 7 produces a pulse-width modulated optical signal which resembles the scanning reflected light signal which is obtained when a bar code is scanned by the bar code reader.

The ordinary pen-type bar code reader 2 emits a light beam through a spherical lens 21 provided on its end. When the bar code is scanned with the spherical lens 21, the light reflected from the bar code is gathered in the bar code reader 2 through the same spherical lens and is converted into an electric signal by a photoelectric conversion section in the bar code reader 2. The construction and operation of the bar code reader and its connected data gathering device are well known; hence, detailed description will not be needed.

For collecting data from a vending machine, reader 2 is inserted into receptacle 51. In this state, the spherical lens 21 of the bar code reader 2 faces the light-emitting section 7. Therefore, the optical signals from the light-emitting section 7 are collected in the bar code reader 2 through the spherical lens 21 and are converted into electric signals by means of a photoelectric conversion section (not shown) in the code reader 2. The bar code reader thereby recovers the data represented by the optical signals emitted by light-emitting through the spherical lens 21, irradiating the light-emitting section 7, and the resulting reflected light returns through the spherical lens 21. This reflected light causes noise which masks the optical signals emitted by light-emitting section 7. Therefore, the positional relationship between the light-emitting section 7 and the spherical lens 21 is selected so that the reflected light is weakened sufficiently before it reaches the spherical lens 21. This is achieved by, for example, offsetting the position of the light-emitting element 7 from the focus of the spherical lens 21.

The optical signal from the light-emitting section 7 resembles that obtained by reflecting light from the bar code when the bar code is scanned with a light beam from the bar code reader 2, as will be understood from the following description.

FIG. 3 shows an example of the bar code symbol in accordance with the JAN (Japan Article Number) standard. When the bar code 10 is scanned in the direction of the arrow by means of a bar code reader 2, the photoelectric conversion section in the bar code reader produces a pulse-width modulated electric signal a portion of which is shown in FIG. 4. The photoelectric conversion section includes a binary circuit so that the signal shown in FIG. 4 is converted to a binary-coded digital signal. The data gathering device incorporates a microprocessor which carries out predetermined operations on the digital signal, thereby decoding the information represented by the bar code.

FIG. 2 is a schematic block diagram of the control section 6 and a portable data gathering device. The control section includes a memory 61 in which administrative data concerning the vending machine are stored, a microprocessor 62 adapted to read the stored data and carry out predetermined operations on the data, and a driving section 63 for switching the light-emitting section 7 on and off in accordance with the pulse-width modulated electrical signal from the microprocessor 62. The microprocessor 62 is adapted to produce, in accordance with the data derived from the memory 61, an electrical signal which resembles the electrical signal obtained through a photoelectric conversion of the scanning light reflected from the bar code. The light emitted from the light-emitting section 7 is focused by the spherical lens 21 onto the photoelctric conversion element 22 so as to be converted into electric signals by the latter. The electric signals thus obtained are amplified by amplifier 23 and converted into binary digital signals by means of the binary circuit. The binary signal is read by microprocessor 11 and stored in memory 12. The data accumulated in memory 12 are read and delivered to an external device as required.

Bar code symbol standards regulate the number and arrangement of white and black bars, so that the microprocessor 62 can read one item of information from the memory 61, and form the signal to be transmitted to the driving section 63 in such a manner that the one item of information corresponds to one bar code symbol.

International bar code symbol standards such as UPC in the U.S.A., EAN in Europe, and JAN in Japan, are in common use, as well as several other standards such as NW-7, Code 39 and so forth. Ordinary portable data gathering devices have bar code reading functions corresponding to respective standards. The control section 6, therefore, has the ability to actuate the light-emitting section 7 according to a selected code standard. This in turn permits a standardization of the interface specification for gathering data from vending machines.

Although the described embodiment incorporates a pen-type bar code reader, the invention is applicable to any type of portable data gathering device equipped with a bar code reader. It is to be understood also that the data gathering object is not limited to vending machines.

A second embodiment of the invention will be described hereinunder with reference to FIGS. 5 to 8. Different pen-type bar code readers commercially available detect different frequency ranges. For instance, some are sensitive to infrared, while others are sensitive to red. Thus, it may sometimes happen that the band of frequencies sensed by the bar code reader does not match the band emitted from the light-emitting element.

Moreover, pen-type bar code readers commercially available incorporate photoelectric conversion elements 22, which often are sensitive to different ranges of frequency. For instance, some of the photoelectric conversion elements have peaks of sensitivity in the red region, while others have peaks in infrared region. Therefore, it may happen that the frequency characteristics of a photoelectric conversion element 22 do not match the frequency of the light emitted from the light-emitting section so that the level of the output is impractically low.

Figure 5:
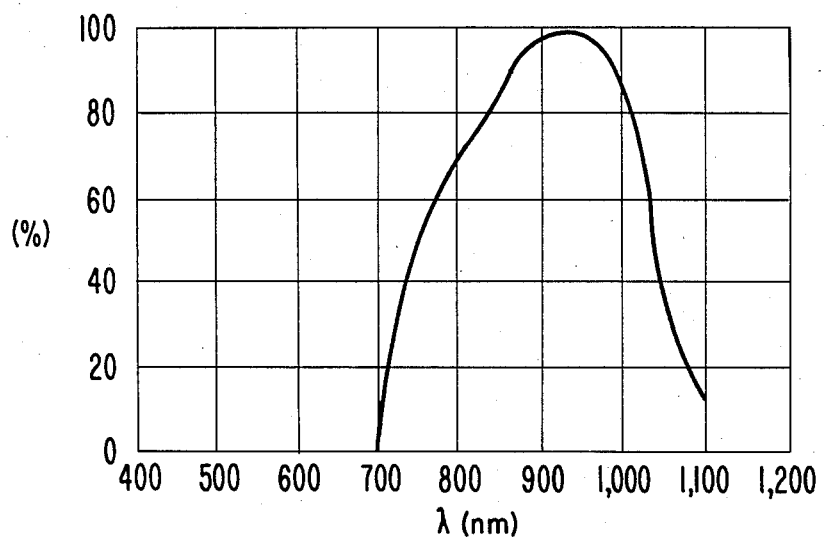
FIG. 5 is a chart showing the spectral sensitivity characteristics of a photodiode with an infrared filter used in a second embodiment of the invention.
Figure 6:
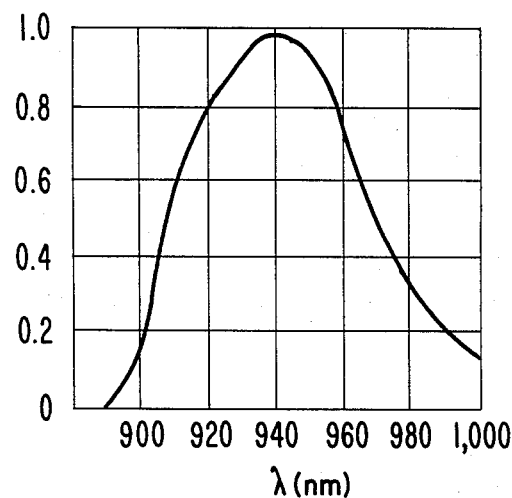
FIG. 6 is a chart showing the emission spectrum of a GaAs infrared light-emitting diode used in the second embodiment.
Figure 7:
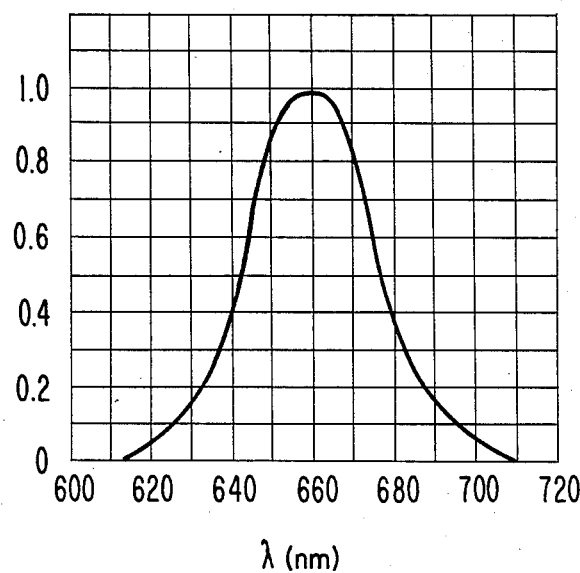
FIG. 7 is a chart showing the emission spectrum of a GaAsP red light-emitting diode used in the second embodiment.

A practical example of such mismatching will be explained with specific reference to FIG. 5. FIG. 5 is a chart showing the spectral sensitivity characteristics of a silicon PIN diaode with an infrared filter. When this photodiode is used as the photoelectric conversion element 22 incorporated in the pen-type bar code reader, the wavelength charcteristics of the light-emitting section and the photoelectric conversion element will only match each other, so as to ensure a sufficiently high level of electric output signal, when the light-emitting section 7 emits a spectrum such as is produced by a GaAs infrared LD (as shown in FIG. 6). However, matching will not occur of the spectrum for the light-emitting diode is as shown in FIG. 7, that associated with a GaAsP red LED. In such a case, the level of the electric output signal from the photoelectric conversion element is so low that the delivery of a signal from the light-emitting section 7 is practically impossible.

Figure 8:
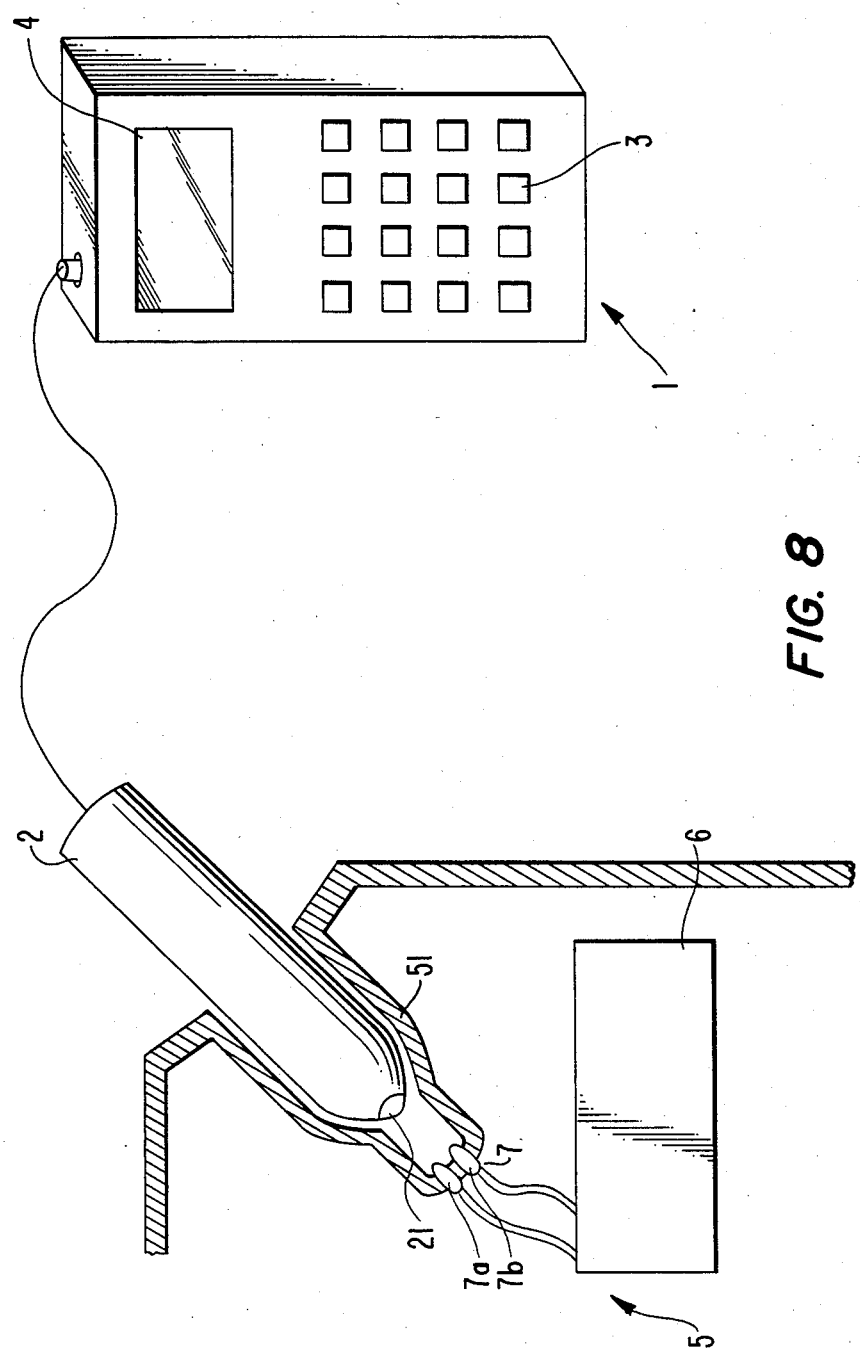
FIG. 8 is an illustration of the coupling between a portable data gathering device and a vending machine in a data gathering system embodying the second embodiment of the invention.

In order to eliminate this problem, the data gathering system in accordance with the second embodiment of the invention shown in FIG. 8 has two light-emitting elements 7a, 7b of different frequency characteristics in the light-emitting section 7 thereof. For instance, light-emitting diodes whose emission spectra are shown in FIGS. 6 and 7 are used simultaneously as the light-emitting elements. It will be seen that a sufficiently strong output signal is obtainable regardless of whether the peak of sensitivity of the photoelectric conversion element is in the infrared region or in the red region. It is to be noted, however, that these two light-emitting elements 7a and 7b are placed close to each other so that light from both element is received by the photoelectric conversion element 22.

The data gathering system of the second embodiment permits simple and quick gathering of data by means of a portable data gathering terminal device having a portable bar code reader from a plurality of remotely located vending machines or other such objective equipment. The light-emitting elements 7a, 7b in combination produce a light signal which resembles that obtained when the bar code is scanned with the bar code reader.

Figure 9:
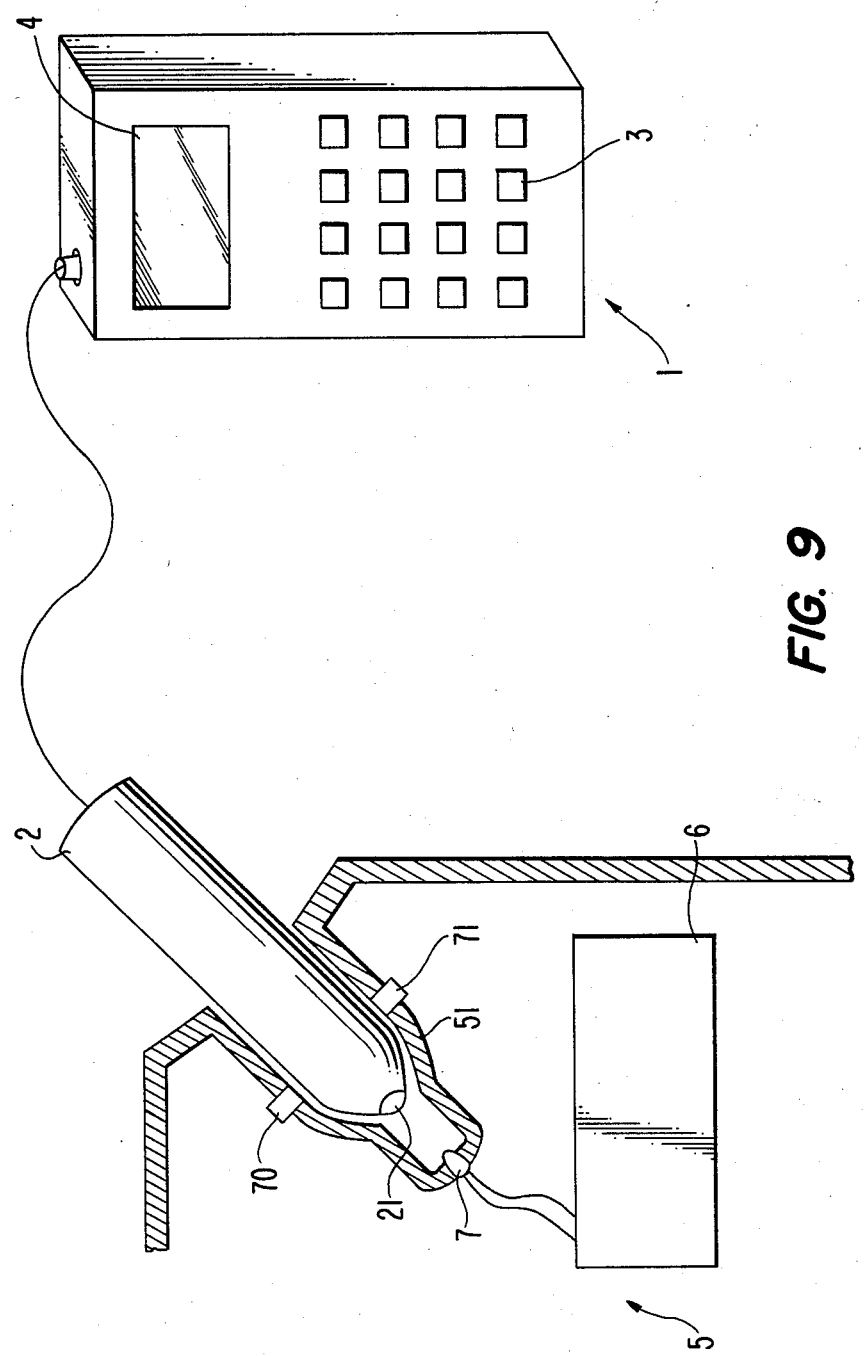
FIG. 9 is an illustration of the coupling between a vending machine and a portable data gathering device in a data gathering system in accordance with the third embodiment of the invention.

A third embodiment of the invention will be described with reference to FIG. 9. This embodiment has a proximity detector which is adapted to detect whether optical coupling has been acheived between the data delivery section of the vending machine and the portable bar code reader.

The detector is composed of a light-emitting element 70 and a photodetector 71 which are arranged in opposition. When the pen-type bar code reader 2 is not received in receptacle 51, the light-emitted from the light-emitting element 70 reaches photodetector 71, while when the bar code reader 2 is properly inserted in receptacle 51, the light from element 70 is interrupted. It is thus possible to detect whether optical coupling has been achieved between the pen-type bar code reader 2 and the data delivery section 5. Although not shown in FIG. 9, signal lines are provided so as to connect light-emitting element 70 and photodetector 71 to the control section 6.

In operation, the system is ready for data transmission after the insertion of the pen-type bar code reader 2 into the receptacle 51. It is, however, necessary that a suitable cue be given to the control section for commencement of the transmission of the opticl signal from the light-emitting section 7. In this embodiment, the cue signal can be given by making use of the light-emitting element 70 and the photodetector 71. After the operator inserts the pen-type bar code reader 2 into the receptacle 51, photodetector 71 detects that the bar code reader 2 has been inserted and gives a detection signal to the control section 6 which in turn commences the data transmission by on-off switching of the light-emitting section 7 (after a predetermined time from the moment of detection). Thus, the data gathering operation can be commenced automatically simply by inserting the pen-type bar code reader 2 in the receptacle 51, by making use of the same proximity detector that detects the insertion of the pen-type bar code reader.

Figure 10:
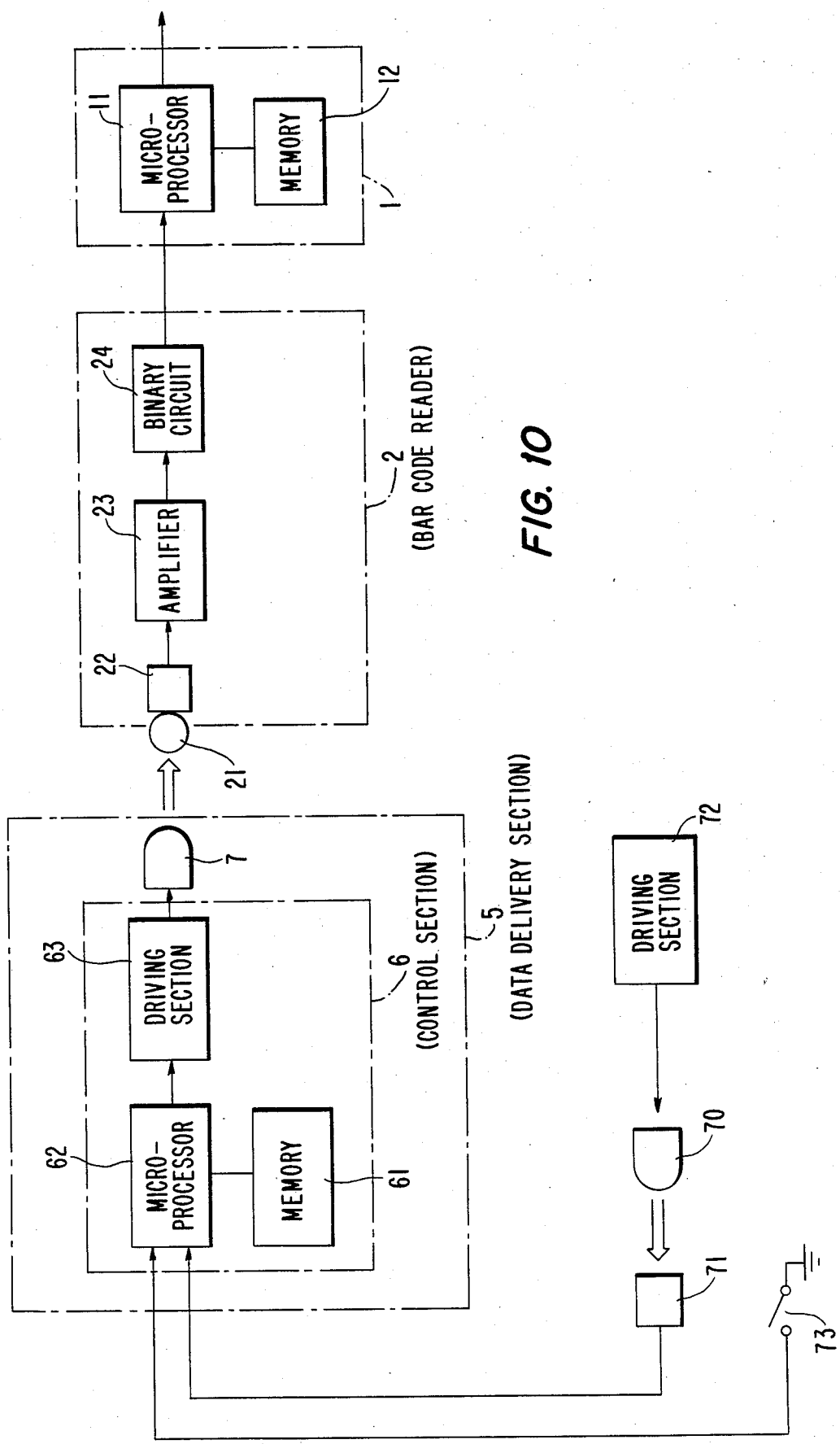
FIG. 10 is a schematic block diagram of a modification of a data gathering system in accordance with the third embodiment of the invention.

FIG. 10 shows a modification in which the cue signal for commencement of data transmission is given by the operator manually by actuation of a data transmission switch 73 on the vending machine. Confirmation as to whether th pen-type bar code reader has been inserted is also necessary in this case and is provided by the combination of the light-emitting element 70 and the photodetector 71.

Although a photodetector is used as the proximity detector, other means such as a mechanical detector may also be used. It is to be noted also that the inserting type arrangement and action are only illustrative and that optical coupling between the bar code reader and the data delivery section can be attained by other means. All that is necessary is that a suitable locating means be provided on either the vending machine or the bar code reader such that a predetermined positional relationship is attained between the bar code reader and the data delivery section.

It will be seen that the third embodiment offers an advantage in that any data delivery failure due to incomplete optical coupling between the bar code reader and the data transmission section can be avoided.

Figure 11:
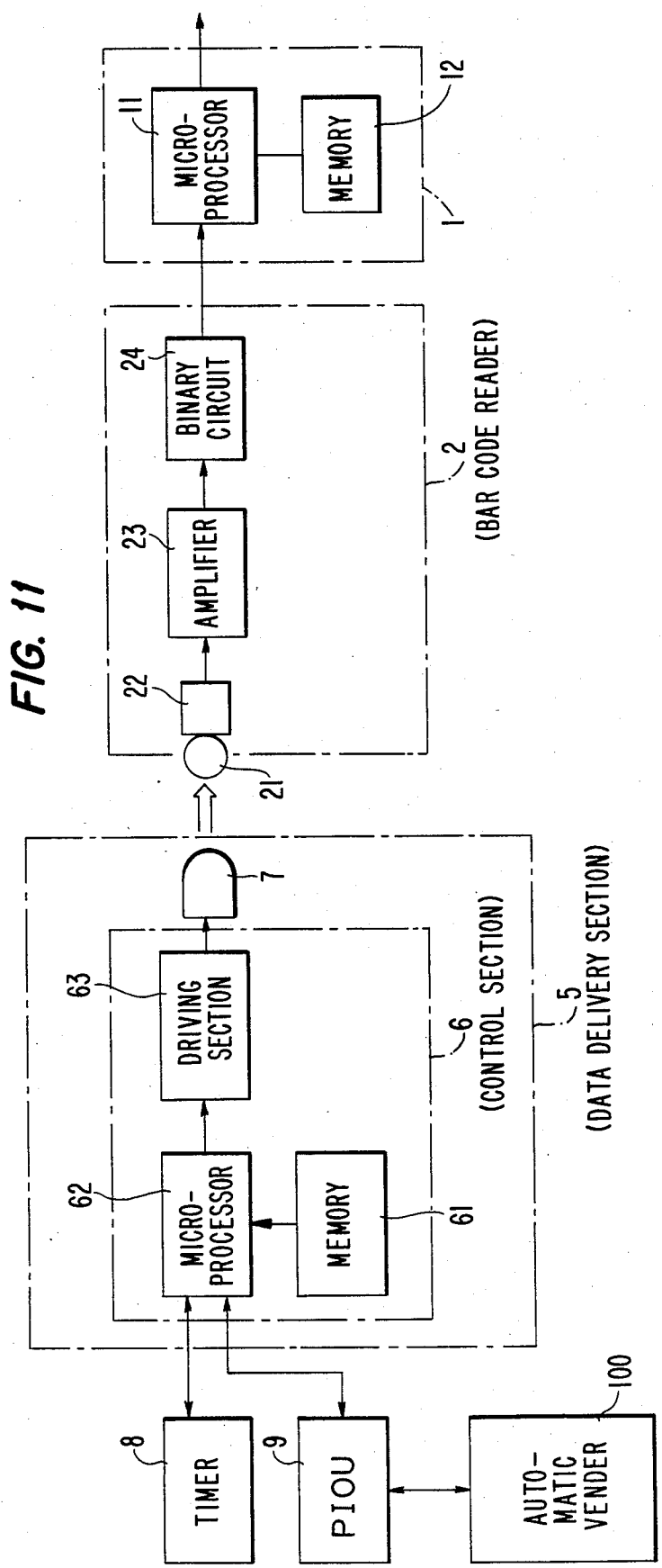
FIG. 11 is a block diagram of a fourth embodiment of the invention.

A fourth embodiment will be explained hereinunder with reference to FIG. 11. The embodiments described above provide no means for confirming whether the data have been received correctly, because transmission takes place in a uni-directional manner. The bar code usually contains error detection features which enable one to detect whether the data has been erroneously read and to inform the operator of the result of the detection by means of a visible or audible signal. The operator can therefore repeat the data gathering operation when he is informed of error. In repeating the data gathering operation, the operator encounters a problem as to the timing of erasure of the data stored in memory 61. For example, where the data stored in memory 61 represent the difference between a value stored at the moment of the present data gathering operation and the value obtained in the preceding data gathering operation, it is necessary that the data be erased each time a data gathering operation is completed. However, when the data gathering operation has to be repeated due to error, care must be taken not to erase the data too soon. Since about 10 minutes is required for the supply of items, collection of money and gathering of the data from each vending machine, data erasure is not permitted until a predetermined period, e.g., 20 minutes, has elapsed after the commencement of the first data gathering operation. This means that the operator can repeat the data gathering operation as many times as necessary, within the given period of 20 minutes. After 20 minutes, microprocessor 62 erases the data stored in memory 61 in accordance with the time information given by timer 8.

It is possible, of course, that after the route operator finishes servicing the machine but before the 20-minute period has passed, a customer will input a vending demand. The data concerning that particular sale will be cleared by the clearing operation which occurs at the 20-minute mark, causing an error in the data which will be gathered next time. In order to overcome this problem, another criterion may be required to be satisfied before the data clearing operation is conducted. Data are cleared at the first occurrence of either of two conditions: passage of 20 minutes from the commencement of data gathering, or receipt of a vending demand after completion of route service.

When a vending demand is input before the passage of 20 minutes, the vending demand signal is input from vending machine 100 to an input terminal having parallel input-output unit (PIOU) 6 as a detector, and this signal is transmitted as an interrupt from a PIOU to microprocessor 62. The microprocessor 62 then clears the data before the vending operation is commenced, and this sale is recorded as new data. The operation of the vending machine itself is well known; consequently, its internal block diagram is omitted from the block diagram shown in FIG. 2. Other portions of this embodiment are materially identical to those of the first embodiment.

Thus, in this fourth embodiment of the invention, the operator is allowed to repeat the data gathering operation as many times as desired, because the data are not cleared unless one of the conditions (elapse of a predetermined time period or receipt of a new vending demand) is met. In addition, the vending machine becomes ready for vending without delay after the completion of the data gathering operation, while properly clearing the content of the memory.

This embodiment can be applied to other types of objective equipment from which data are to be gathered (other than vending machines), and the same effect is also obtainable in such uses provided that the abovementioned conditions, when applied to general objective equipment from which data are to be gathered, can be expressed as follows:

(1) Elapse of a predetermined time from the commencement of the data gathering operation, or (2) Occurrence of a demand for changing the context of the memory.

Although in the described embodiment the PIOU 9 is separate from microprocessor 62, the function of the PIOU may be satisfied in microprocessor 62 when the latter is a so-called single-chip microprocessor, and the advantage of the described embodiment is equally obtainable in such a case.

In some cases, circumstances do not allow addition of a data delivery section in existing vending machines. In such cases, the data can be gathered by making use of the keypad 3 of the portable data gathering device. Thus, the invention offers an advantage in that the same data gathering device can collect data not only from objective equipment provided with data delivery sections but also from objective equipment which are not provided with data delivery sections.

According to the invention, the signals used for data transmission are regulated in accordance with international bar code standards. This in turn permits a wider selection of portable data gathering devices. For instance, the user can purchase a cheaper portable data gathering dvice so as to realize an inexpensive data gathering system.

The second embodiment in particular offers an advantage in that it overcomes the problem due to mismatching between the frequency characteristics of light-emitting section 7 and the photoelectric conversion element in the bar code readers commercially available.

The third embodiment in particular is advantageous in that the data gathering operation can be conducted with less chance of error by virtue of the detector which detects the completion of optical coupling between the data delivery section and the portable bar code reader.

Finally, the fourth embodiment provides a data clearing means which permits redundant data gathering operations within a given period, thus assuring accurate transmission of the data.

Although the invention has been described through specific terms, it is to be noted that the described embodiments are not exclusive and various changes and modifications may be imparted thereto without departing from the scope of the invention which is limited solely by the appended claims.

What is claimed is:

1. A data transmitter for transmitting data in the form of a bar code by means of width-modulated light pulses, said data transmitter comprising:
   memory means for storing the data;
   processor means connected to said memory means for converting the data to width-modulated electrical pulses resembling the bar code; and
   light emitting means connected to said processor means for converting the width-modulated electrical pulses to width-modulated light pulses, said light emitting means comprising a plurality of light emitting elements each having a different frequency characteristics for converting the electrical pulses to a plurality of frequency bands of light pulses.

2. A data transmitter for transmitting data in the form of a bar code by means of width-modulated light pulses, said data transmitter comprising:
   memory means for storing the data;
   processor means connected to said memory means for converting the data to width-modulated electrical pulses resembling the bar code;
   light emitting means connected to aid processor means for converting the width-modulated electrical pulses to width-modulated light pulses, said light emitting means comprising a plurality of light emitting elements each having a different frequency characteristic for converting the electrical pulses to a plurality of frequency bands of light pulses; and
   proximity detection means connected to said processor means for indicating whether the data receiver is suitably positioned to receive the light pulses, the indication being used by said processor means to initiate conversion of the data.

3. A data transmitter for transmitting data in the form of a bar code by means of width-modulated light pulses, said data transmitter comprising:
   memory means for storing the data;
   processor means connected to said memory means for converting the data to width-modulated electrical pulses resembling the bar code;
   light emitting means connected to said processor means for converting the width-modulated electrical pulses to width-modulated light pulses, said light emitting means comprising a plurality of light-emitting elements each having a different frequency characteristic for converting the electrical pulses to a plurality of frequency bands of light pulses;
   demand detection means connected to said processor means for detecting a demand to change the data; and
   timer means connected to said processor means for indicating the passage of a predetermined period of time following transmission of the data;
   wherein the data are erased from said memory means at the first occurrence of either (a) detection by said demand detection means of a demand to change the data, or (b) indication by said timer means of passage of the predetermined period of time.

4. A data collection system for collecting data from a plurality of remotely located machines comprising:

data delivery means in each of said machines for storing the data and converting the data to width-modulated light pulses resembling a bar code; and a portable bar code reading device to detect the width-modulated light pulse and to recover the data from the light pulses, said data delivery means converting data to light pulses in a plurality of frequency bands.

5. A data collection system for collecting data from a plurality of remotely located machines comprising:

data delivery means in each of said machines for storing the data and converting the data to width-modulated light pulses resembling a bar code; and a portable bar code reading device to detect the width-modulated light pulses and to recover the data from the light pulses, said data delivery means comprising proximity detection means for indicating whether said portable bar code reading device is suitably positioned to detect the light pulses, the indication being used by said data delivery means to initiate conversion of the data.

6. A data collection system for collecting data from a plurality of remotely located machines comprising:

data delivery means in each of said machines for storing the data and converting the data to width-modulated light pulses resembling a bar code;

a portable bar code reading device to detect the width-modulated light pulse and to recover the data from the light pulses;

demand detection means in each of said machines for detecting a demand to change the data; and timer means connected to said demand detection means for indicating the passage of a predetermined period of time following conversion of the data to light pulses;

wherein the data are cleared from storage at the first occurrnce of either (a) detection by said demand detection means of a demand to change the data, or (b) indication by said timer means of passage of the predetermined period of time.

* * * * *